(12) United States Patent
Matsubayashi et al.

(10) Patent No.: US 8,715,869 B2
(45) Date of Patent: May 6, 2014

(54) FUEL CELL, METHOD FOR OPERATING FUEL CELL AND FUEL CELL SYSTEM

(71) Applicant: Sanyo Electric Co., Ltd., Osaka (JP)

(72) Inventors: Takaaki Matsubayashi, Osaka (JP); Mitsuo Karakane, Osaka (JP); Yasunori Yoshimoto, Osaka (JP); Akira Hamada, Osaka (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/933,103

(22) Filed: Jul. 1, 2013

(65) Prior Publication Data

US 2013/0288141 A1  Oct. 31, 2013

Related U.S. Application Data

(62) Division of application No. 13/250,505, filed on Sep. 30, 2011, now Pat. No. 8,563,181, which is a division of application No. 10/725,339, filed on Dec. 2, 2003, now Pat. No. 8,067,126.

(30) Foreign Application Priority Data

Dec. 2, 2002 (JP) ................................. 2002-350541
Dec. 2, 2002 (JP) ................................. 2002-350546

(51) Int. Cl.
*H01M 8/04* (2006.01)

(52) U.S. Cl.
USPC ............................ 429/413; 429/437; 429/457

(58) Field of Classification Search
USPC ........................................................ 429/413
See application file for complete search history.

(56) References Cited

U.S. PATENT DOCUMENTS 5,382,478 A    1/1995  Chow et al.
6,274,259 B1   8/2001  Grasso et al.
(Continued)

FOREIGN PATENT DOCUMENTS

JP    3-102774    4/1991
JP    6-89730     3/1994

OTHER PUBLICATIONS

Office Action issued in U.S. Appl. No. 13/250,452 dated Nov. 10, 2011.

(Continued)

*Primary Examiner* — John S Maples
(74) *Attorney, Agent, or Firm* — McDermott Will & Emery LLP

(57) ABSTRACT

A fuel cell, a method for operating a fuel cell and a fuel cell system, which ensure no dew condensation for a wet reaction gas in the inlet area of gas channels in plates in a fuel cell stack, are provided. Gas channels 2 and heat medium channels are disposed on one surface and the other surface of one plate 1, respectively. Gas channels are disposed on the other plate such that they face the gas channels 2 in the plate 1. A gas inlet header 3 is disposed at the upper part of the gas channel 2 in the plate 1 and a heat medium inlet header is disposed at the upper part of the heat medium channels such that they face the gas inlet header on the other side. Cooling water such as heat medium is supplied from the heat medium supply manifold hole 7 to the heat medium inlet header, thereby warming up the same. The water vapor in the reaction gas (wet fuel gas) is prevented from being condensed in the inlet area of the gas channels 2 by heating up the gas inlet header by the heat conduction.

6 Claims, 7 Drawing Sheets

(56) References Cited

U.S. PATENT DOCUMENTS

| | | |
|---|---|---|
| 6,566,002 B2 | 5/2003 | Yoshimoto et al. |
| 6,645,652 B2 | 11/2003 | Cownden et al. |
| 6,713,204 B2 | 3/2004 | Shimanuki et al. |
| 6,924,052 B2 | 8/2005 | Lee |
| 2002/0015870 A1 | 2/2002 | Cownden et al. |

OTHER PUBLICATIONS

Notice of Allowance issued in U.S. Appl. No. 13/250,472 dated Mar. 20, 2012.

Notice of Allowance issued in U.S. Appl. No. 13/250,452, dated Mar. 2, 2012.

Notice of Allowance issued in U.S. Appl. No. 13/250,495 dated Jun. 19, 2012.

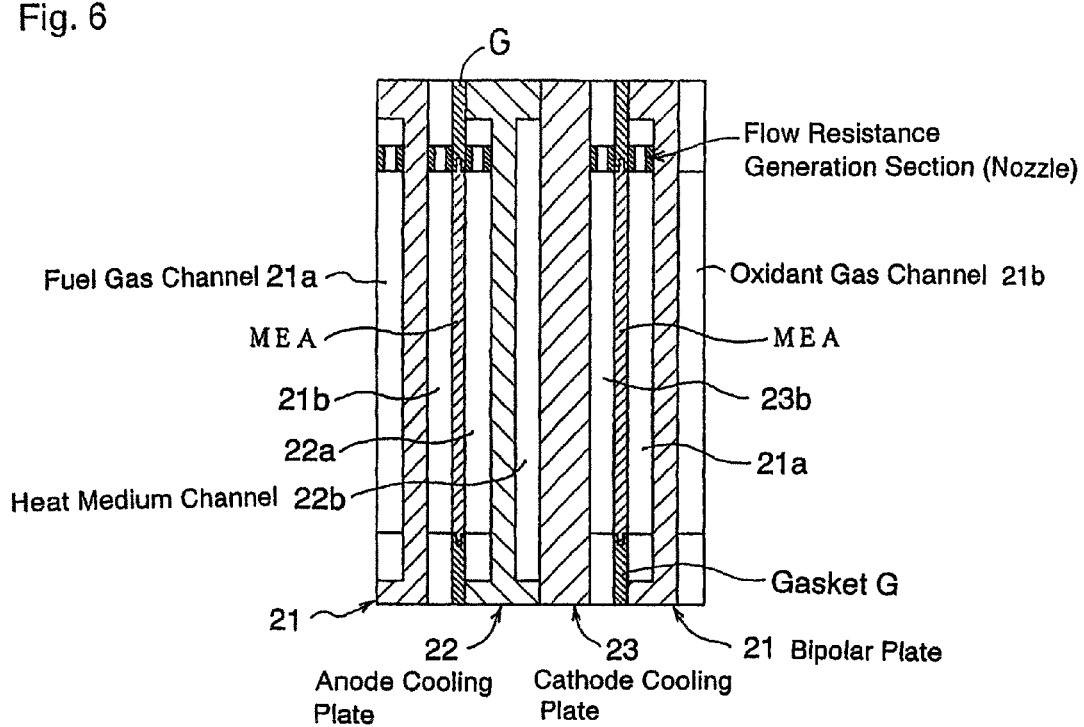
Fig. 6
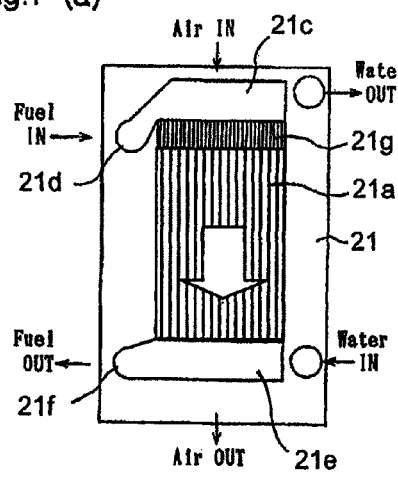 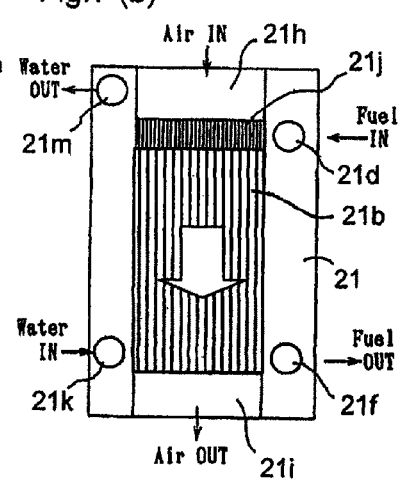
Fig.7 (a)  Fig.7 (b)

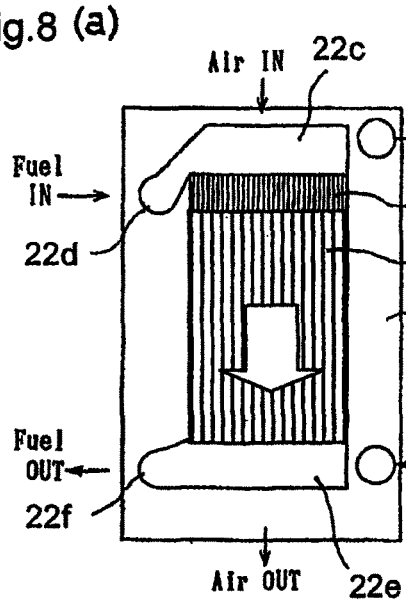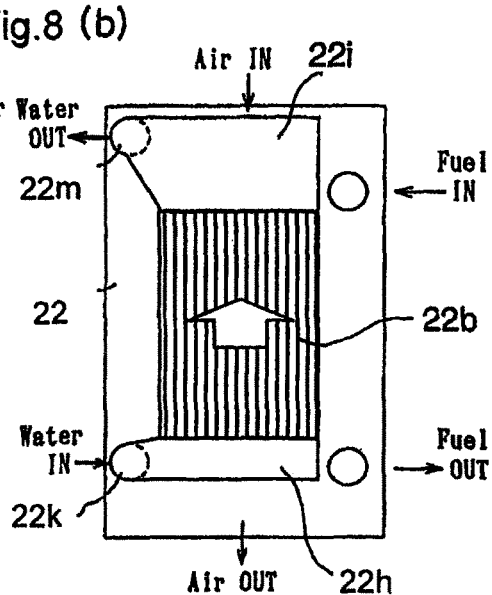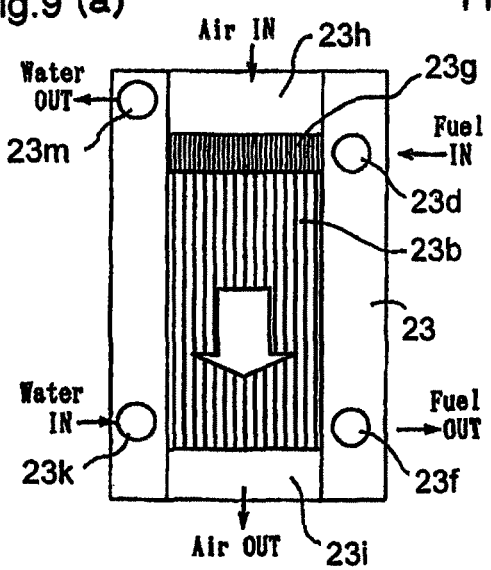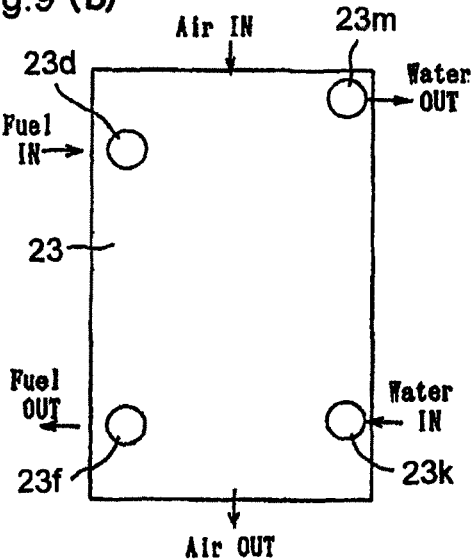

FUEL CELL, METHOD FOR OPERATING FUEL CELL AND FUEL CELL SYSTEM

RELATED APPLICATIONS

This application is a Divisional of U.S. application Ser. No. 13/250,505, filed on Sep. 30, 2013, now U.S. Pat. No. 8,563,181, which is a Divisional of U.S. application Ser. No. 10/725,339, filed on Dec. 2, 2003, now U.S. Pat. No. 8,067,126, claiming priority of Japanese Patent Application Nos. 2002-350541 and 2002-350546, filed on Dec. 2, 2002, the entire contents of each of which are hereby incorporated by reference.

BACKGROUND OF THE INVENTION

1. Field of the Invention

The present invention relates to a fuel cell, which is capable of preventing the dew condensation at a reaction gas header in a plate by humidifying the stacked cells in a fuel cell stack, wherein the heat discharged from the fuel cell stack is efficiently used for humidifying the cells. The present invention also relates to a method for operating such a fuel cell and to a fuel cell system, which are suitable for the operation of such a fuel cell.

2. Description of the Related Art

In a conventional polymer electrolyte fuel cell, an anode (fuel electrode) and cathode (air electrode) are deposited respectively on one surface and the other surface of a solid polymer electrolyte membrane to form a unified element as a cell (membrane electrode assembly), and a unit fuel cell is formed by clamping the cell between both a plate (a separator) having concave groove-shaped fuel gas channels on the surface facing the anode and another plate (another separator) having concave groove-shaped oxidant gas channels on the surface facing the cathode. Such a plurality of unit fuel cells are stacked and unified into a single unit by fastening the unit fuel cells together, using a bolt passing through the unit fuel cells and end plates adapted onto both ends thereof. Thus, a fuel cell stack is formed by the unit cells. In the operation, a fuel gas (hydrogen gas or reforming gas composed of mainly hydrogen) is supplied into the fuel gas channels and an oxidant gas (normally air) is supplied into the oxidant gas channels, so that a DC electric power is obtained from the electrochemical reaction which takes place via the solid polymer electrolyte membrane.

In such a polymer electrolyte fuel cell, it is required to humidify the solid polymer electrolyte membrane in order to obtain proper proton conductivity during a period for generating the electric power. In the prior art, therefore, the reaction gas (fuel gas and/or oxidant gas) is supplied into gas channels in the plate, after humidifying the reaction gas with a humidifier, so that the solid polymer electrolyte membrane is maintained in a moist state. In particular, it is preferable that the solid polymer electrolyte membrane is humidified with the reaction gas at the dew point equal to the temperature of the membrane or the cell temperature or higher in order to obtain sufficiently high proton conductivity.

Regarding the method for supplying a reaction gas having a dew point near the cell temperature, U.S. Pat. No. 5,382,478 discloses a method of humidifying the reaction gas, using a heat resulting from a fuel cell in the state where cooling water for the fuel cell comes into contact with the reaction gas via a water permeable membrane. Since, however, the evaporation heat significantly increases with the increase of the temperature, the fuel cell is mostly operated at a temperature of 65° C. to 70° C. A further increase of the temperature in the fuel cell requires a greater difference between the dew point of the reaction gas and the temperature of the fuel cell.

However, for example, when a reaction gas having a dew point near the cell temperature is supplied to in such a plate A as shown in FIG. 5, water vapor is condensed in a manifold B, and therefore the condensed water, i.e., the dew clogs the inlet of the gas channel C, thereby causing the flow of the reaction gas to be interrupted. Even when the dew point of the reaction gas is set at a temperature smaller than the cell temperature to some extent in order to avoid the above phenomenon, the dew condensation still takes place in gas channels C in response to the consumption of the reaction gas, so that the dew clogs the gas channels C and the supply of the reaction gas is suppressed. As a result, the reaction gas is not uniformly distributed, and therefore the amount of the reaction gas to be supplied to the electrode becomes insufficient and further the generation of the electric power is not normally carried out, thereby causing the performance of the fuel cell to be deteriorated. In particular, the gas flow resistance becomes larger in the vicinity of curved sections in the gas channels C, so that the condensed water is adhered thereto, thereby causing the gas channels to be clogged. In order to avoid this fact, Japanese Patent Publication No. 2761059 discloses a technical measure, in which, for example, S-shaped gas channels are replaced with those in the form of straight line and the condensed water is moved to downstream by supplying the reaction gas from top to bottom in the direction of gravity, and in which each water supplying channel is further interposed between the adjacent gas channels to enhance an efficiency in cooling the fuel cell stack. Moreover, as for means for preventing the deterioration of the power generation performance resulting form the condensed water, Japanese Unexamined Patent Application Publication No. 6-89730 discloses a technical measure, in which, for example, water absorbing elements are disposed in the gas channels and/or a dry gas is supplied at the middle portion in the gas channels to remove the condensed water.

In the above-described prior arts, the moisture content in the solid polymer electrolyte membrane and the temperature at the fuel cell stack can be maintained within predetermined ranges, so that an excellent responsibility of transferring to a heavy load for the fuel cell stack can be obtained and therefore a high output can be obtained in a short time, thereby enabling a stable operation to be ensured for such a load variation. However, regarding the suppression of dew condensation in the vicinity of the gas channel inlet in the case when the dew point of the reaction gas is increased up to a temperature near the cell temperature, satisfactory results cannot be always obtained. Regarding the countermeasure for the clogging of the reaction gas channels due to the water condensed in the gas channels, the above-described prior arts require either the insertion of water-absorbing material into the gas channels of the plate or the mounting of holes and channels for supplying dry gas in the middle portion of the gas channels. This causes to provide a complicate structure in the fuel cell and to require a lot of work for mounting these components and for manufacturing the fuel cell. It may be stated, therefore, that no sufficient countermeasure is yet introduced into the prior arts.

Regarding a fuel cell system in the prior art, it is necessary to dispose a heat source inside the fuel cell system in order to increase the dew point of the reaction gas near the cell temperature. Moreover, when the dew point of the reaction gas is higher than the temperature of the fuel cell stack, the dew condensation takes place without delay after the reaction gas is supplied to the fuel cell stack. Accordingly, it is necessary to control the relationship between the dew point of the reaction gas and the temperature of the fuel cell stack. The prior art method for humidifying the reaction gas, using the heat from the fuel cell, and bringing the cooling water for the fuel cell comes into contact with the reaction gas via a water permeable membrane, ensures that the dew point of the reaction gas is always smaller than the temperature of the fuel cell stack to some extent. In this case, however, the heat of evaporation strongly increases with the increase of the temperature, so that the fuel cell is operated at a temperature of 65° C. to 70° C. In addition, almost all the heat of the cooling water is used for humidification, so that it is difficult to recover the heat from the cooling water in the case of a cogeneration application.

SUMMARY OF THE INVENTION

Accordingly, it is an object of the present invention to provide a polymer electrolyte fuel cell, which is equipped with plates having a simple structure, and, which is capable of being stably operated in the state where the dew point of the reaction gas is increased close to the cell temperature.

It is another object of the present invention to provide a method for operating a polymer electrolyte fuel cell the same, which method is suitable for operating the same.

It is another object of the present invention to provide a fuel cell system, which includes a heat source for increasing the dew point of the reaction gas such that it approaches the cell temperature, and which ensures an easy control of temperature and a high efficiency in recovering the heat from the cooling water in the fuel cell.

Moreover, it is another object to provide a fuel cell system, which includes polymer electrolyte fuel cells capable of being operated in the state where the reaction gas has a dew point having an increased amount near the cell temperature.

To attain the above-mentioned objects, the following measures are provided in the present invention.

In a first aspect of the invention, a fuel cell is formed by stacking a plurality of plates each having reaction gas channels or heat medium channels in a fuel cell stack, wherein an inlet header for at least one side of reaction gas channels is disposed so as to face the inlet header or the outlet header for said heat medium channels. In accordance with the first aspect of the invention, the temperature at the reaction gas inlet header can be maintained by using the heat medium. As a result, water vapor contained in the reaction gas is not condensed and therefore no dew condensation is generated in the inlet area for the gas channels, thereby enabling a normal operation to be ensured for the generation of electric power along with an enhanced performance of the cell.

In a second aspect of the invention, it is included in the first aspect of the invention that the inlet header for said reaction gas channels is maintained at a temperature of the dew point of gas or greater with aid of the heat medium. In accordance with the second aspect of the invention, the dew condensation can be securely prevented at the reaction gas inlet header.

In a third aspect of the invention, a fuel cell is formed by stacking a plurality of plates each having reaction gas channels in a fuel cell stack, wherein the inlet header for one side of reaction gas channels is disposed such that it faces the inlet header for the other side of reaction gas channels. In accordance with the third aspect of the invention, the one reaction gas inlet header can be maintained at a predetermined temperature by the other side of reaction gas.

In a fourth aspect of the invention, it is included in the third aspect of the invention that the dew point of the one side of reaction gas is set at the temperature of the other side of reaction gas or smaller in the fuel cell according to the third aspect. In accordance with the fourth aspect, the inlet header for the one side of reaction gas can be maintained at a temperature of the dew point or greater by the other side of reaction gas to prevent dew condensation.

In a fifth aspect of the invention, a fuel cell is formed by stacking a plurality of plates each having reaction gas channels or heat medium channels, wherein an inlet header for one side of reaction gas and an inlet header for the other side of reaction gas are disposed such that they face an inlet header or an outlet header for the heat medium. In accordance with the fifth aspect, the reaction gas inlet header can be maintained at a predetermined temperature by the heat medium.

In a sixth aspect of the invention, it is included in the fifth aspect of the invention that the one side of reaction gas and the other side of reaction gas flow parallel to each other from top to bottom in the direction of gravity, and wherein both sides of reaction gas flow in direction parallel (co-flow) or anti-parallel (counter-flow) to the heat medium. In accordance with the sixth aspect, the reaction gas can be efficiently heated up by the heat medium.

In a seventh aspect of the invention, it is included in the fifth or sixth aspect of the invention that channels for the one side of gas, the other side of gas and the heat medium are shaped straight in the respective portions facing an anode or cathode electrode section. In accordance with the seven aspect of the invention, the straight channels having no curved portion ensure a smooth flow of the reaction gas, along with a smooth discharge of the condensed water.

In an eighth aspect of the invention, it is included in one of the fifth to seventh aspects of the invention that the dew point of at least one of the supplied reaction gases≤the temperature of heat medium at the inlet in the case when at least one of the reaction gases and the heat medium flow in the direction parallel to each other, whereas the dew point of at lease one of the supplied reaction gases≤the temperature of the heat medium at the outlet in the case when at least one of the reaction gases and the heat medium flow in the direction anti-parallel to each other. In accordance with the eight aspect of the invention, the dew condensation can be prevented at the reaction gas inlet header.

In a ninth aspect of the invention, it is included in the eight aspect of the invention that wherein a following equation is established in the case when at least one of the reaction gases and the heat medium flow in the direction parallel to each other, the dew point for at least one side of discharged reaction gas≥the temperature of the heat medium at the outlet, whereas another equation is established in the case when at least one of the reaction gases and the heat medium flow in the direction anti-parallel to each other, the dew point for at least one side of discharged reaction gas≥the temperature of the heat medium at the inlet. In accordance with the ninth aspect of the invention, the electrode portions can be humidified by condensing the water in the gas channels. Moreover, the variation in the pressure loss can be reduced by dew condensation in all the gas channels, thereby enabling the gas distribution to be homogenized. For instance, an increased gas flow rate in part of the gas channels causes the amount of condensed water to be increased. This causes the pressure loss to be increased and further the gas flow rate to be lowered.

In a tenth aspect of the invention, it is included in the third aspect of the invention that the heat medium is supplied so as to flow at an area facing the downstream area for the reaction gas inlet header, wherein the heat medium heat-exchanged at an area facing the electrode section is supplied so as to flow at an area facing the reaction gas inlet header. In accordance with the tenth aspect of the invention, the cell can be maintained in a humidified state by dew condensation in the reaction gas at the area facing the downstream area for the inlet header for the reaction gas, and at the same time, the dew condensation can be prevented by heating up the reaction gas at the inlet header for the reaction gas.

In an eleventh aspect of the invention, it is included in the tenth aspect of the invention that a following equation is established, the dew point for at least one side of reaction gas≥the temperature of the heat medium at the inlet. In accordance with the eleventh aspect of the invention, the effect resulting from the tenth aspect can be ensured.

In a twelfth aspect of the invention, it is included in one of the first to eleventh aspects of the invention that a flow resistance generation section is disposed at the inlet for at least one side of reaction gas. In accordance with the twelfth aspect of the invention, the flow of the reaction gas can be regulated, and the distribution of reaction gas in the respective gas channels can be homogenized, so that the water dew condensed in the lower level area can be discharged to the outlet of the gas channels by the pushing force.

In a thirteenth aspect of the invention, it is included in the twelfth aspect of the invention that the reaction gas inlet header includes the flow resistance generation section. In accordance with the thirteenth aspect of the invention, the effect resulting from the twelfth aspect can be ensured. Since, moreover, the flow resistance generation section can be maintained at a temperature equal to or greater than the dew point of the reaction gas, the dew condensation can be prevented there.

In a fourteenth aspect of the invention, it is included in any one of the first to thirteenth aspects of the invention that an oxidant humidifier and a fuel humidifier are connected to the fuel cell according to any one of the first to thirteenth aspects, and the heat medium discharged from the fuel cell is heat-exchanged in these humidifiers. In accordance with the fourteenth aspect of the invention, a dew point of the reaction gas near the temperature of the cell can be obtained only by the heat in the heat medium in the case of a low operation temperature (for example, 70° C. or less).

In a fifteenth aspect of the invention, an oxidant humidifier and/or a fuel humidifier, and a total heat exchanger are connected to a fuel cell, and the heat medium discharged from the fuel cell is heat-exchanged in these humidifiers, wherein the total heat exchange is carried out between at least one side of reaction gas in the reaction gas discharged from the fuel cell and at least one side of reaction gas in the reaction gas before supplied to said humidifiers. In accordance with the fifteenth aspect of the invention, a humidifying temperature near the temperature of the cell can be obtained by the heat in the heat medium and by using the heat recovered from the gas discharged from the fuel cell, in the case of a high cell temperature (for example, 70° C. or more).

In a sixteenth aspect of the invention, the fuel cell and the method of operating the same employed in the fuel cell system according to the fifteenth aspect of the invention are characterized respectively by a fuel cell and a method for operating the same according to any one of the first to fifteenth aspects of the invention. In accordance with the sixteenth aspect, the effect resulting from the first to fifteenth aspects can be ensured.

In a seventeenth aspect of the invention, it is included in any one of the fourteenth to sixteenth aspects of the invention that the heat medium discharged from the fuel cell is first heat-exchanged in one humidifier in which either the oxidant gas or fuel gas flows at a higher flow rate, and then heat-exchanged in the other humidifier. In accordance with the seventeenth aspect of the invention, when the air is used as an oxidant gas, the heat exchange is firstly carried out in the air humidifier due to a greater flow rate of air. Accordingly, the difference between the dew point of the oxidant gas and that of the fuel gas can be reduced, thereby enabling the performance of the cell to be enhanced.

As described above, the present invention is usefully applicable to both a polymer electrolyte fuel cell and a method for operating the same. The present invention is also applicable to a fuel cell system, which is used in a power generation system with such a polymer electrolyte fuel cell, a cogeneration system and others.

Further objects, features and advantages of the present invention will become apparent form the following description of the preferred embodiments with reference to the accompanying drawings.

BRIEF DESCRIPTION OF THE DRAWINGS

FIG. 6 is a schematic sectional view of a component in a fuel cell stack used in a fuel cell system according to the invention;

FIG. 7(a) is a plan view of a bipolar plate mounted in a fuel cell stack according to the invention viewed from the side of the fuel gas channels;

FIG. 7(b) is a plan view of the same viewed from the oxidant gas channel side;

FIG. 8(a) is a plan view of an anode cooling plate mounted in a fuel cell stack according to invention viewed from the side of the fuel gas channels;

FIG. 8(b) is a plan view of the same viewed from the side of the water channels;

FIG. 9(a) is a plan view of a cathode cooling plate mounted in a fuel cell stack according to the invention viewed from the side of the oxidant gas channels;

FIG. 9(b) is a plan view of the same on the side on which no gas channels are formed.

DESCRIPTION OF THE PREFERRED EMBODIMENTS

Referring now to the accompanying drawings, several embodiments of a fuel cell according to the invention will be described.

Embodiment 1

Figure 1A:
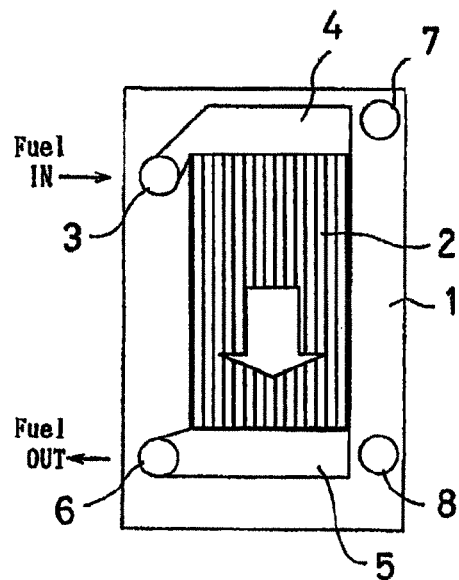
FIG. 1(a) is a plan view of a first plate (plate 1) mounted in a fuel cell stack according to an embodiment of the present invention viewed from the side of the fuel gas channels.
Figure 1B:
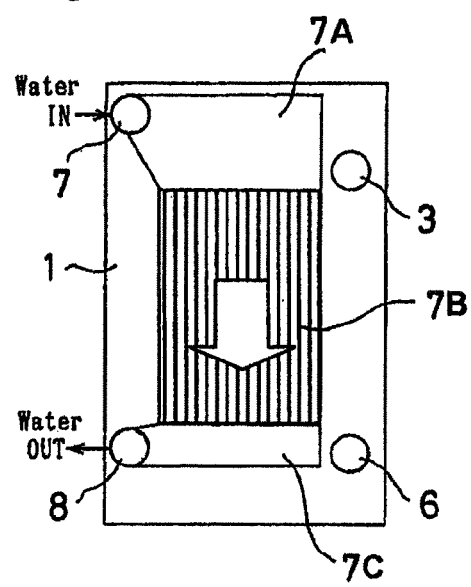
FIG. 1(b) is a plan view of a first plate (plate 1) mounted in a fuel cell stack viewed from the side of the water channels.
Figure 1C:
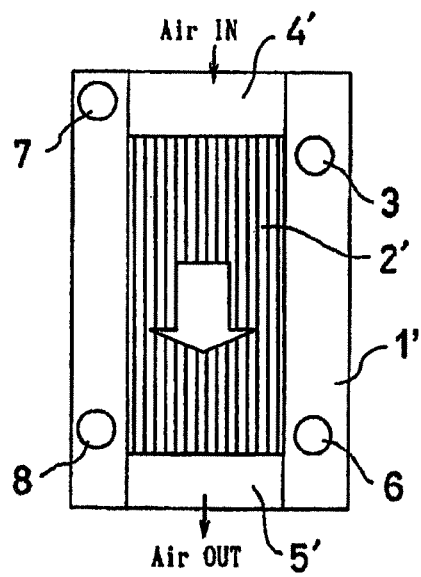
FIG. 1(c) is a plan view of a second plate (the other plate) mounted in a fuel cell stack viewed from the side of the air channels.
Figure 1D:
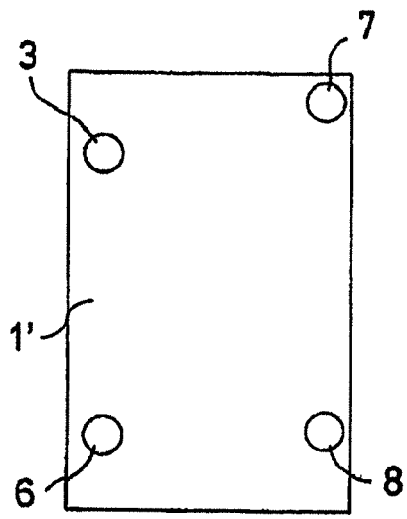
FIG. 1(d) is a plan view of a second plate (the other plate) mounted in a fuel cell stack viewed from the side on which no gas channels are formed.
Figure 2A:
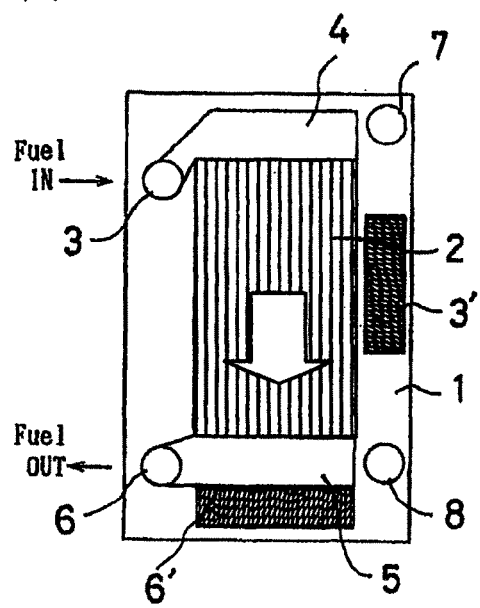
FIG. 2(a) is a plan view of a first plate (plate 1) mounted in a fuel cell stack according to an embodiment of the present invention viewed from the side of the fuel gas channels.
Figure 2B:
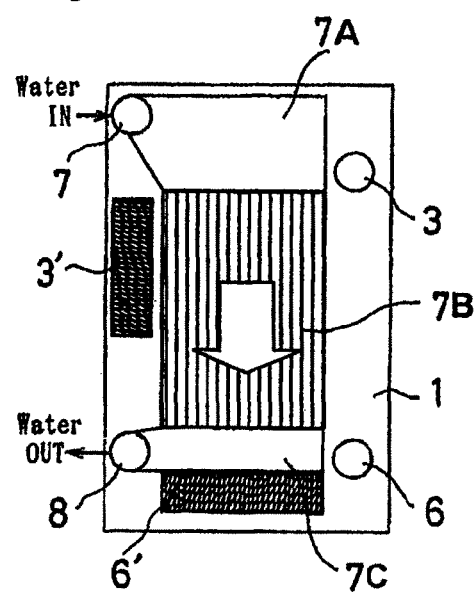
FIG. 2(b) is a plan view of a first plate (plate 1) mounted in a fuel cell stack viewed from the side of the water channels.
Figure 2C:
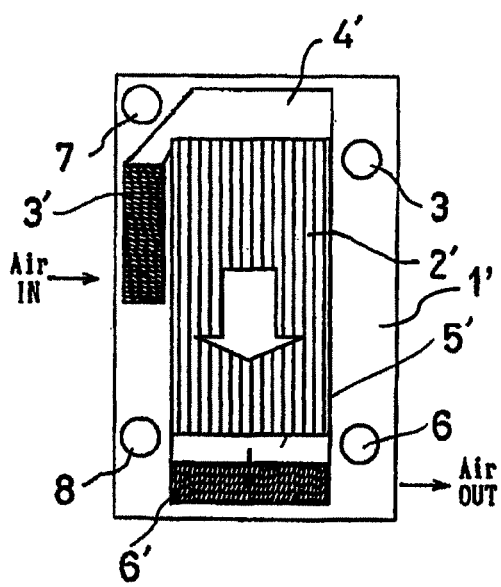
FIG. 2(c) is a plan view of a second plate (the other plate) mounted in a fuel cell stack viewed from the side of the air channels.
Figure 2D:
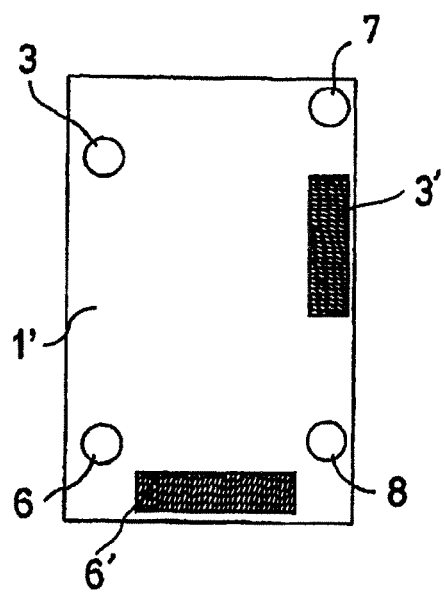
FIG. 2(d) is a plan view of a second plate (the other plate) mounted in a fuel cell stack viewed from the side on which no gas channels are formed.

Each of FIG. 1(a), FIG. 1(b), FIG. 1(c) and FIG. 1(d) is a plan view of a fuel cell according to the invention in a first embodiment. FIG. 1(a) is a plan view of a first plate mounted in a fuel cell stack, viewed from the side of the fuel gas channels and shows the side of a first surface of the first plate. FIG. 1(b) is a plan view of the first plate mounted in the fuel cell stack, viewed from the side of the water channels and shows the side of a second surface of the first plate. FIG. 1(c) is a plan view of the other plate (a second plate) mounted in the fuel cell stack, viewed from the side of the air channels and shows the side of a third surface of the second plate. FIG. 1(d) is a plan view of the second plate mounted in the fuel cell stack, viewed from the side on which no gas channels are formed and shows the side of a fourth surface of the second plate. Reference numeral 1 shown in FIG. 1(a) and FIG. 1(b) and reference numeral 1' shown in FIG. 1(c) and FIG. 1(d) mean the plates (i.e. the first and second plates) typically made of carbon, respectively. In FIG. 1(a), a plurality of concave groove-shaped gas channels 2 is formed on one surface (the first surface) of the plate 1 so as to align in the up/down direction (the direction of gravity). In FIG. 1(b), a plurality of concave groove-shaped water channels 7B is formed on the other surface (the second surface) of the plate 1 so as to align in the up/down direction (the direction of gravity) to be back to back each other. In this case, a gas supply manifold hold 3 is disposed on the upper left side of the plate 1 so as to pass therethrough, and the gas supply manifold hole 3 is connected to a gas inlet header 4 in the concave form. Moreover, the gas inlet header 4 is further connected to the gas channels 2. The gas inlet header 4 is defined as an area where a reaction gas (fuel gas or oxidant gas) supplied in a distributed state from the gas supply manifold hole 3 is further supplied to the inlet of the gas channels 2 (the same definition is applied in the following). Such a gas inlet header 4 is generally called as a manifold.

The outlet of the gas channels 2 is connected to a gas outlet header 5 in the concave form, which is disposed in the lower part of the plate 1, and the gas outlet header 5 is connected to a gas discharge manifold hole 6 which is disposed on the lower left side of the plate 1 so as to pass therethrough. As a result, a reaction gas (in this case, fuel gas) is supplied and distributed to the gas inlet header 4 of the plate 1 in each cell via the gas supply manifold hole 3, which is aligned in the stacking direction of the fuel cell stacks, and then distributed from the gas inlet header 4 to the gas channels 2, so that the reaction gas is supplied from top to bottom in the gas channels 2, and then discharged from the gas outlet header 5. At the same time, the supplied reaction gas flows into a gas discharge manifold hole 6 aligned in the stacking direction of the fuel cell stack, and finally discharged to the outside from the end portion of the fuel cell stack via the gas discharge manifold hole 6.

On the upper right side of the plate 1 (the side opposite to the gas supply manifold hole 3), a water supply manifold hole 7 is disposed so as to pass through the plate 1, and referring to FIG. 1(b) the water supply manifold hole 7 is connected to a water inlet header 7A in the concave form, which is disposed on the other surface (second surface) of the plate 1. In FIG. 1(b) the water inlet header 7A is further connected to the inlet of the water channels 7B. In this case, the gas inlet header 4 and the water inlet header 7A are disposed respectively on the one surface (the first surface) and the other surface (the second surface) of the plate 1 to be back to back with each other.

Moreover, a water outlet header 7C in the concave form is disposed at the outlet of the water channels 7B in the plate 1, and the water outlet header 7C is connected to a water discharge manifold hole 8, which is disposed on the lower right side of the plate 1 (on the side opposite to the gas discharge manifold hole 6) so as to pass therethrough. As a result, the water supplied from the end portion of the fuel cell stack (in this case, cooling water) is supplied and distributed to the water inlet header 7A of the plate 1 in the respective cells through the water supply manifold 7, which is aligned in the stacking direction of the fuel cell stack. The supplied water is distributed in water channels 7B from the water inlet header 7A and is supplied from top to bottom along the water channels 7B, and then discharged into the water outlet header 7C, and further flows into the water discharge manifold hole 8, which is aligned in the stacking direction of the fuel cell stack. Finally, the water is discharged to the outside from the end portion of the fuel cell stack after passing through the water discharge manifold hole 8.

On the other hand, in FIG. 1(c), a plurality of gas channels 2' corresponding to the gas channels 2 in the plate 1 shown in FIG. 1(a) and FIG. 1(b) is disposed from top to bottom (in the direction of gravity) in the other plate (the second plate) 1'. A gas inlet header 4' in the concave form is connected to the inlet of the gas channels 2' and a gas outlet header 5' in the concave form is connected to the outlet of the gas channels 2'. As a result, in the other plate 1', an oxidant gas (In this case, air introduced from the outside air) is supplied to the gas inlet header 4', and distributed into the gas channels 2' from the gas inlet header 4'. Then, the oxidant gas flows from top to bottom along the gas channels 2', and discharged to the gas outlet header 5', and finally discharged to the outside of the fuel cell stack.

A cell is inserted between the gas channels 2 of the plate 1 and the gas channels 2' of the other plate 1', and the composite member thus formed is mounted in the fuel cell stack. In this case, a unit cell is constituted by contacting closely and facing the anode of the cell to the gas channels 2 of the plate 1 and by contacting closely and facing the cathode of the cell to the gas channels 2' of the other plate 1'. Then, the fuel cell stack is constituted by stacking the unit cells to form a unit cell. Regarding the gas inlet headers 4, 4', the gas outlet header 5, 5', the water inlet header 7A and the water outlet header 7C (7C is shown in FIG. 1(b)), the upper surface of the concave portion is covered by a gasket or the like, thereby enabling the leakage of gas and water to be prevented.

In the fuel cell thus constituted, the fuel gas flows in the gas channels 2 of the plate 1 and the oxidant gas flows in the gas channels 2' of the other plate 1'. As a result, an electrochemical reaction takes place via the polymer electrolyte membrane of the cell, thereby enabling the DC electric power to be generated.

In order to humidify the polymer electrolytic membrane of the cell in the saturated state, the fuel gas is supplied to the fuel cell stack, after it is humidified with, for example, a humidifier at a dew point close to the cell temperature. In the prior art, a wet fuel gas is cooled particularly in the inlet area of the gas channels 2, when it is supplied to the gas channels 2, so that the water vapor contained in the gas is dew condensed to form the dew. As a result, the condensed water is adhered to inside wall of the gas channels 2 and clogs them, thereby causing the flow of the fuel gas to be interrupted. In this embodiment, however, the water inlet header 7A is disposed so as to be close to the gas inlet header 4 so as to be back to back with each other. As a result, the water inlet header 7A is heated by the cooling water as a heat medium supplied thereto, and the gas inlet header 4 is indirectly heated up by the heat conduction, thereby making it possible to prevent the water vapor contained in the fuel gas from dew condensation.

In order to suppress the dew condensation by the cooling water as a heat medium, the temperature of the cooling water should be set at the dew point of the fuel gas or greater (the dew point of the fuel gas≤the temperature of the cooling water at the inlet). Furthermore, it is preferable that the temperature of the oxidant gas (air) is set so as to fulfill the following relationship: The dew point of the fuel gas≤the dew point of the air the temperature of the cooling water at the inlet.

In this embodiment, the cooling water is used as a heat medium for preventing the dew condensation in the fuel gas. However, the oxidant gas can be used for the heat medium instead of the cooling water. In this case, the gas inlet header 4' for the oxidant gas is disposed close to the gas inlet header 4 for the fuel gas in the plate 1 on the other surface, although the arrangement is not shown, and water channels 7B for supplying the cooling water are disposed in the other plate 1'. Furthermore, in order to prevent the dew condensation of the fuel gas by the oxidant gas (air), the temperature of the air inlet is set such that the dew point of the fuel gas≤the temperature of the air.

Embodiment 2

Each of FIG. 2(*a*), FIG. 2(*b*), FIG. 2(*c*) and FIG. 2(*d*) is a plan view of a fuel cell according to the invention in a second embodiment. This embodiment is different from the first embodiment as for the point that an inner air manifold system is employed in the second embodiment. FIG. 2(*a*) is a plan view of a first plate mounted in a fuel cell stack, viewed from the side of the fuel gas channels and shows the side of a first surface of the first plate, FIG. 2(*b*) is a plan view of the first plate mounted in the fuel cell stack, viewed from the side of the water channels and shows the side of a second surface of the first plate. FIG. 2(*c*) is a plan view of the other plate (a second plate) mounted in the fuel cell stack, viewed from the side of the air channels and shows the side of a third surface of the second plate. FIG. 2(*d*) is a plan view of the second plate mounted in the fuel cell stack, viewed from the side on which no gas channels are formed and shows the side of a fourth surface of the second plate. Reference numeral 1 shown in FIG. 2(*a*) and FIG. 2(*b*) and reference numeral 1' shown in FIG. 2(*c*) and FIG. 2(*d*) mean plates (i.e. the first and second plates) typically made of mainly carbon, respectively. In FIG. 2(*a*), a plurality of gas channels 2 in the form of concave grooves are disposed from top to bottom (in the direction of gravity) on one surface (a first surface) of the plate 1, and a gas supply manifold hole 3 is disposed on the upper left side of the plate 1 in such a way that it passes through the plate 1, and the gas supply manifold hole 3 is connected to a gas inlet header 4 in the concave form. Moreover, the gas inlet header 4 is connected to the gas channels 2. Such a gas inlet header 4 is generally called as a manifold. In FIG. 2(*b*), a plurality of water channels 7B in the form of concave grooves are disposed from top to bottom (in the direction of gravity) on the other surface (the second surface) of the plate 1 in such a way that the gas channels 2 and the water channels 7B are back to back each other.

Referring to FIG. 2(*a*) the outlet of the gas channels 2 is connected to a gas outlet header 5 in the form of a concave shape, and the gas outlet header 5 is connected to a gas discharging manifold hole 6, which is disposed on the lower left side of the plate 1 so as pass therethrough. As a result, a reaction gas (fuel gas) supplied from the end portion of the fuel cell stack is distributed to the gas inlet header 4 of the plate 1 in each cell via the gas supply manifold hole 3 which is aligned in the stacking direction of the fuel cell stack, and the reaction gas is further distributed from the gas inlet header 4 into the gas channels 2, so that the gas thus distributed flows from top to bottom along the gas channels 2, and it is discharged to the gas outlet header 5 and further flows into the gas discharge manifold hole 6 aligned in the stacking direction of the fuel cell stack. Finally, the reaction gas is discharged from the end portion of the fuel cell stack to the outside via the gas discharge manifold hole 6.

In addition, a water supply manifold hole 7 is disposed on the upper right side of the plate 1 (on the side opposite to the gas supply manifold hole 3). In FIG. 2(*b*), the water supply manifold hole 7 is connected to the water inlet header 7A in the form of a concave shape, which is disposed on the other surface of the plate 1, and the water inlet header 7A is connected to the inlet of the water channels 7B.

Moreover, a water outlet header 7C in the concave form is disposed in the outlet of the channels on the other surface of the plate 1, and the water outlet header 7C is connected to a water discharge manifold hole 8, which is disposed on the lower right side of the plate 1 (on the side opposite to the gas discharge manifold hole 6) so as pass therethrough. As a result, water (cooling water), which is supplied from the end portion of the fuel cell stack, is supplied and distributed to the water inlet header 7A, in the plate 1 of each cell via the water supply manifold hole 7 aligned in the stacking direction of the fuel cell stack, and the water is further distributed from the water inlet header 7A to the water channels 7B. Thereafter, the water flows from top to bottom along the water channels 7B, and it is discharged to the water outlet header 7C and then flows into the water discharge manifold hole 8 aligned in the stacking direction of the fuel cell stack. Finally, the water is discharged to the outside from the end portion of the fuel cell stack via the water discharge manifold hole 8.

On the other hand, referring to FIG. 2(*c*), a plurality of gas channels 2' corresponding to the gas channels 2 in the plate 1 shown in FIG. 2(*a*) and FIG. 2(*b*) are arranged from top to bottom (in the direction of gravity) in the other plate (the second plate) 1'. In this case, a gas supply manifold hole 3' is disposed on the upper right side of the other plate 1' so as to pass therethrough, and the gas supply manifold hole 3' is connected to a gas inlet header 4' in the concave form, and further the gas inlet header 4' is connected to the gas channels 2'.

In FIG. 2(*c*), the outlet of the gas channels 2' in the other plate 1' is connected to the gas outlet header 5' in the concave form, which is disposed in the lower part of the other plate 1', and the gas outlet header 5' is further connected to a gas discharge manifold hole 6', which is disposed in the lower end of the other plate 1' so as to pass therethrough. As a result, oxidant gas (air) supplied from the end portions of the fuel cell stack is supplied and distributed to the gas inlet header 4' on the other plate 1' in each cell via the gas supply manifold hole 3' aligned in the stacking direction of the fuel cell stack, and then distributed to the gas channels 2' from the gas inlet header 4'. The oxidant gas thus distributed flows from top to bottom along the gas channels 2', and it is discharged to the gas outlet header 5'. Thereafter, the oxidant gas flows into the gas discharge manifold hole 6' aligned in the stacking direction of the fuel cell stack and is discharged from the end portion of the fuel cell stack to the outside via the gas discharge manifold hole 6'.

Similarly to the first embodiment, each cell is inserted between the gas channels 2 in the plate 1 and the gas channels 2' in the other plate 1', and the composite elements obtained after the insertion are mounted in the fuel cell stack. In this case, an anode in the cell faces the gas channels 2 in the plate 1 and contacts closely thereto, and a cathode in the cell faces the gas channels 2' in the other plate 1' and contacts closely thereto, so that a unit cell is formed. The fuel cell stack is produced by stacking such unit cells to form a unit. In this case, the gas inlet header 4, gas outlet header 5, water inlet headers 7A and the water outlet header 7C are covered on their concave upper surface by a gasket or the like, so that the leakage is prevented.

In the fuel cell stack thus formed in the second embodiment, the fuel gas flows into the gas channels 2 of the plate 1 and the oxidant gas flows into the gas channels 2' of the other plate 1', so that the electrochemical reaction takes place via the polymer electrolyte membrane of the cell, thereby enabling a DC electric power to be generated.

As described above, in order to humidify the polymer electrolyte membrane of the cell in the saturated state, a fuel gas is supplied to the fuel cell stack after humidified with, for example, a humidifier such that the dew point is close to the cell temperature. In the second embodiment, the water inlet header 7A is disposed such that it is close to the gas inlet header 4 on the other surface, so that the water inlet header 7A is heated by the cooling water supplied thereto, and the gas inlet header 4 is indirectly heated by the heat conduction, thereby making it possible to prevent the water vapor contained in the fuel gas from condensing. Accordingly, the clogging of the fuel gas due to the condensed water can be suppressed, and a normal operation in the generation of the electric power is ensured, thereby enabling high performance of the cell to be maintained.

In order to suppress the dew condensation resulting from the cooling water, the inlet for the cooling water is set at the dew point of the fuel gas or grater (the dew point of the fuel gas≤the temperature of the cooling water at the inlet). Furthermore, it is preferable that the temperature relationship for the oxidant gas (air) is set such that the dew point of the fuel gas≤the dew point of the air≤the temperature of the cooling water at the inlet. If, moreover, the cooling water at the outlet is set at a temperature equal to or smaller than the dew point of the reaction gas at the outlet, the solid polymer electrolyte membrane can be securely humidified. In this case, since the dew condensation occurs in all the gas channels, the deviation in the pressure loss is reduced and therefore a uniform gas distribution can be obtained.

In the second embodiment, the cooling water is also used as a heat medium for preventing the dew condensation of the fuel gas. However, the oxidant gas can be used as the heat medium instead of the cooling water. In this case, the gas inlet header 4' for the oxidant gas is disposed close to the gas inlet header 4 for the fuel gas in the plate 1 on the other surface (the second surface), although the arrangement is not shown, and water channels 7B for supplying the cooling water are disposed in the other plate 1'. Furthermore, in order to prevent the dew condensation of the fuel gas by the oxidant gas (air), the temperature of the air inlet is set such that the dew point of the fuel gas≤the temperature of the air.

In the first and second embodiments, the reaction gas and the cooling water flow in the direction parallel to each other as well as in the direction of gravity at the area facing the electrodes. However, it is possible to employ the structural arrangement in which the reaction gas and the cooling water flow in the direction anti-parallel to each other. In this case, the relationship, the dew point of the fuel gas≤the dew point of the air≤the temperature of the cooling water at the outlet, is preferably set.

Embodiment 3

Each of FIG. 3(*a*), FIG. 3(*b*), FIG. 3(*c*) and FIG. 3(*d*) is a plan view of a fuel cell according to the invention in a third embodiment. FIG. 3(*a*) is a plan view of a first plate mounted in a fuel cell stack, viewed from the side of the fuel gas channels and shows the side of a first surface of the first plate. FIG. 3(*b*) is a plan view of the first plate mounted in the fuel cell stack, viewed from the side of the water channels and shows the side of a second surface of the first plate. FIG. 3(*c*) is a plan view of the other plate (a second plate) mounted in the fuel cell stack, viewed from the side of the air channels and shows the side of a third surface of the second plate. FIG. 3(*d*) is a plan view of the second plate mounted in the fuel cell stack, viewed from the side on which no gas channels are formed and shows the side of a fourth surface of the second plate. In FIG. 3(*a*) and FIG. 3(*b*), the structure of a plate (the first plate) 1 is basically similar to that in the second embodiment. Also, in FIG. 3(*c*) and FIG. 3(*d*), the structure of the other plate (the second plate) 1' is basically similar to that in the second embodiment. As a result, the same reference numeral is attached to the same structural element as in the second embodiment and therefore detailed description thereof is omitted. Hence, detailed description is given exclusively to the structural elements different from those in the second embodiment. A main difference between the second and third embodiments is that a flow resistance generation section 9 is disposed at the inlet area of the gas channels 2 in the plate 1.

Figure 4:
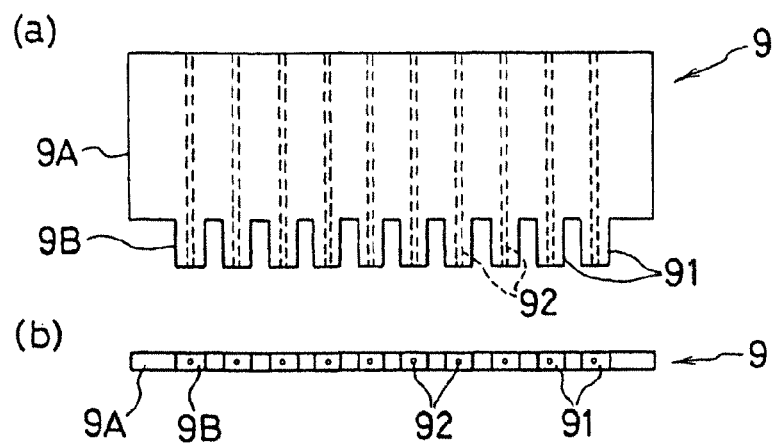
FIG. 4(a) is a plan view of an embodiment of a flow resistance generation section mounted in a fuel cell according to the invention.
FIG. 4(b) is a front view of the same.
Figure 5:
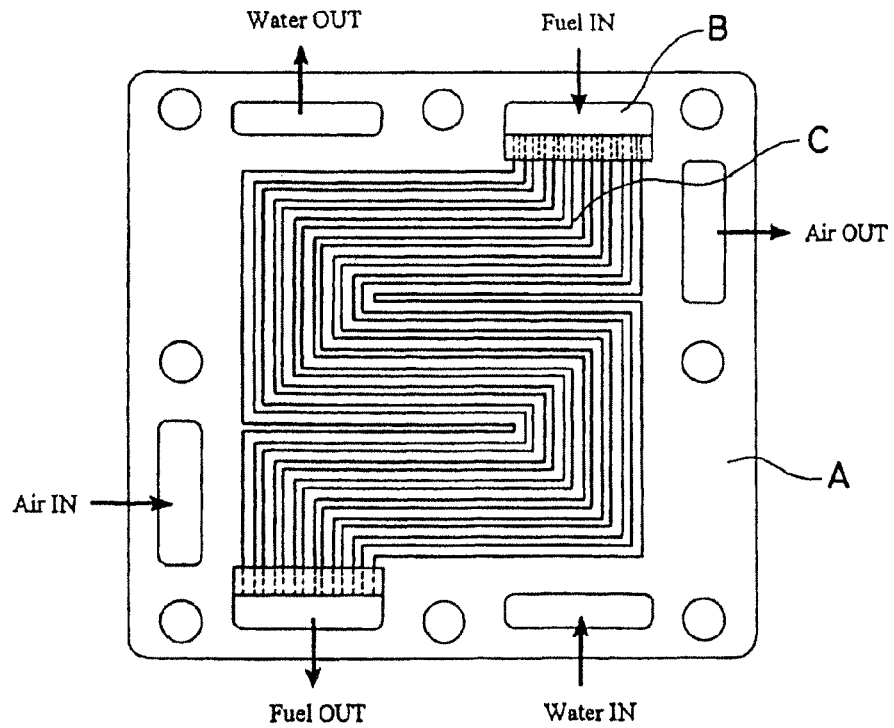
FIG. 5 is a plan view of a plate used in a conventional fuel cell.

The flow resistance generation section 9 has, for example, such a structure as shown in FIG. 4. FIG. 4(*a*) is a plan view of the flow resistance generation section 9 and FIG. 4(*b*) is a front view of the same. The flow resistance generation section 9 is formed by a thin plate-like base plate 9A having a connection section 9B, in which projection pieces 91 in the form of teeth are arranged with a predetermined spacing in one end of the base plate 9A. In this case, a nozzle hole 92 is disposed in each projection piece 91 in such a way that it passes through the center thereof from the other end of the base plate 9A.

The flow resistance generation section 9 can be formed in a unified body from a material, which is selectable from synthetic resin, such as polyacetal, polymethylpentene, polyphenylene ether, polyphenylen sulfide and liquid crystal polymer. Any resin for the material can be used, so long as it provides an excellent fluidity in the molding process, a high precision in the finishing, an appropriate flexibility and an excellent thermal conductivity.

Figure 3A:
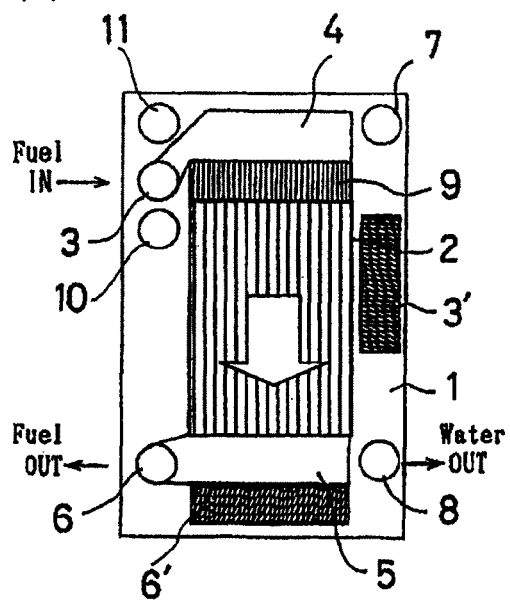
FIG. 3(a) is a plan view of a first plate (plate 1) mounted in a fuel cell stack according, to an embodiment of the present invention viewed from the side of the fuel gas channels.

The flow resistance generation section 9 is designed, as for the size, to fit on the concave portion (not shown) in the inlet of the gas channels 2, and as for the thickness, such that the upper surface of the section 9 is located at the same level as the upper surface of the plate 1, when it is fitted on the concave portion. The flow resistance generation section 9 is mounted onto the concave portion by adhesion. In this case, the mounting is carried out such that the projection pieces 91 are inserted into the corresponding flow channels in the gas channels 2. As a result, the gas inlet header 4 and the gas channels 2 are securely connected to each other via the nozzle holes 92. FIG. 3(a) shows that the gas inlet header 4 and the gas channels 2 are connected to each other via the flow resistance generation section 9. The diameter of the nozzle hole 92 is about 0.25 mm on the side of the inlet (on the side of the gas inlet header 4), and 0.22 mm on the side of the outlet (on the side of the gas channels 2), and each nozzle hole 92 is tapered to some extent such that the gas passing through the hole can be ejected therefrom.

Figure 3B:
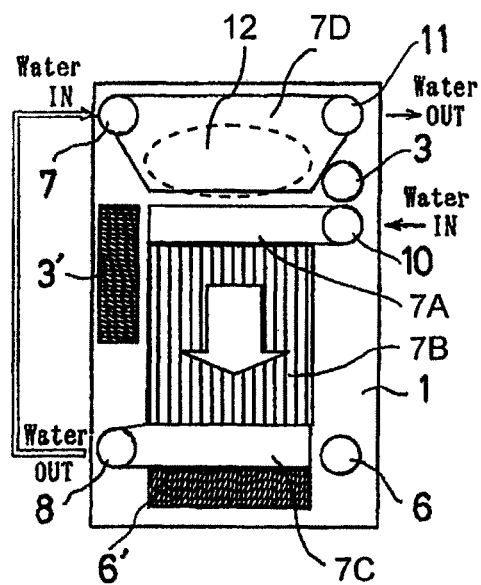
FIG. 3(b) is a plan view of a first plate (plate 1) mounted in a fuel cell stack viewed from the side of the water channels.
Figure 3C:
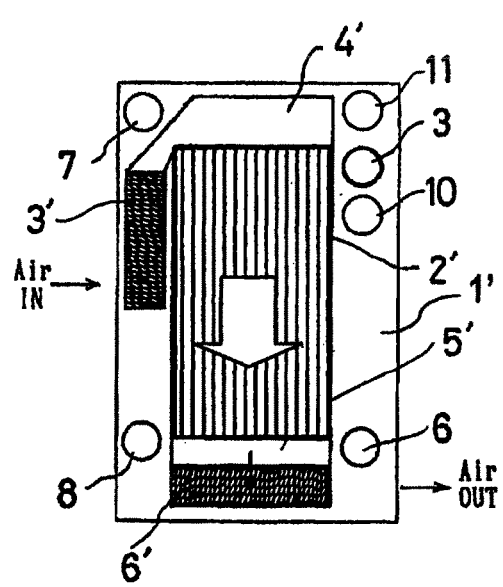
FIG. 3(c) is a plan view of a second plate (the other plate) mounted in a fuel cell stack viewed from the side of the air channels.
Figure 3D:
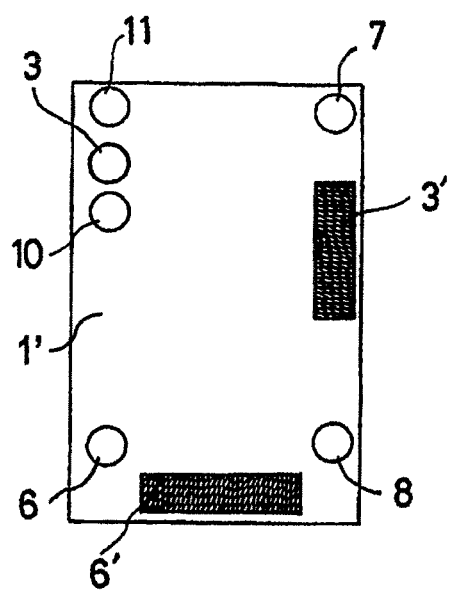
FIG. 3(d) is a plan view of a second plate (the other plate) mounted in a fuel cell stack viewed from the side on which no gas channels are formed.

Referring to FIG. 3(a), FIG. 3(b), FIG. 3(c) and FIG. 3(d), aside from the water supply manifold hole 7, a second water supply manifold hole 10 is disposed in both the plate 1 and the other plate 1' so as to pass therethrough. Referring to FIG. 3(b), cooling water is supplied from the second water supply manifold hole 10, and in the water channels 7B on the other surface (the second surface) of the plate 1, the cooling water is introduced into an area located somewhat downstream from the flow resistance generation section 9 shown in FIG. 3(a). A difference between the second and the third embodiments also resides in such a structural arrangement.

Moreover, in FIG. 3(b), a second water discharge manifold hole 11 is disposed on the upper left side of the plate 1 (on the side opposite to the water supply manifold hole 7) so as to pass therethrough, and it is connected to the water header 7D. In this case, the water supply header 7D is separated from the inlet (the water inlet header 7A) of the water channels 7B for supplying the cooling water by disposing a partition wall in the interface to the inlet of the water channels 7B. A difference between the second and the third embodiments also resides in such a structural arrangement.

In the third embodiment, as shown in FIG. 3(b), the cooling water is supplied from the second water supply manifold hole 10 to the water channels 7B in the plate 1, and the flows from top to bottom in the water channels 7B. Thereafter, the cooling water is discharged from the outlet of the water channels 7B to the water supply manifold hole 8, and it is further supplied from the water discharge manifold hole 8 to the water supply manifold hole 7 as shown in FIG. 3(b). Moreover, the cooling water is supplied to the water supply header 7D and discharged from the water supply header 7D to the second water discharge manifold hole 11, and then flows in the stacking direction of the fuel cell stack, and finally discharged from the end portion of the fuel cell stack to the outside.

In the above water circulating channel, the means for supplying the cooling water from the water discharge manifold hole 8 to the water supply manifold hole 7 can be realized, for example, by concave groove-shaped channels (not shown) which are connected to the water discharge manifold hole 8 and to the water supply manifold hole 7 on the other surface of the plate 1, or by a tube-shaped connection channel disposed either in the end plate of the fuel cell stack or outside the fuel cell stack such that the water discharge manifold hole 8 is connected to the water supply manifold hole 7. In this case, the cooling water is supplied in the water channels 7B in the plate 1 and then returned to the water supply header 7D in the plate 1.

The reason why the cooling water is supplied from the second water supply manifold hole 10 is due to the fact that the polymer electrolyte membrane in the cell connecting to the gas channel 2 is humidified and maintained in the saturated moist state, in which case, the cooling water cools the inlet area for the water channels 7B, and further cools the inlet area for the gas channels 2 facing the water channels 7B on the other surface, so that the dew point of the fuel gas is lowered when the fuel gas is introduced into the gas channels 2, and thereby the water vapor contained in the fuel gas is compulsively condensed.

Furthermore, the reason why the cooling water passed through the water channels in the plate 1 is again returned to the water supply header 7D is due to the fact that the area surrounded by the broken line in FIG. 3(b) is warmed up, in which case, the flow resistance generation section 9 is disposed in an area facing the above-mentioned area on the other surface, and the flow resistance generation section 9 is warmed up by the heat conduction, so that the dew condensation in the nozzle holes 9 is prevented.

In the inlet area of the gas channels 2, the fuel gas is maintained in the state where the dew condensation occurs easily, thereby making it possible to prevent the polymer electrolyte membrane from being dried up. In this case, a fuel gas is ejected from the nozzle hole 92 of the flow resistance generation section 9, even if the water vapor is excessively condensed in the gas channel 2. Therefore, the condensed water adhered to the inner wall of the gas channel 2 is blown off, and it can be moved to the outlet at the downstream. As a result, the flow of the fuel gas is no longer hindered, because the condensed water does not clog the gas channels 2, and therefore a reduction in the performance of the fuel cell can be prevented before it happens.

In the third embodiment where the flow resistance generation sections 9 are equipped and the return of the cooling water is provided, it is preferable that the following conditions are set up: The dew point of the air≥the dew point of the fuel gas≥the temperature at the inlet for the cooling water in the second water supply manifold hole 10; and at the same time, the dew point of the fuel gas≤the temperature at the inlet for the cooling water in the water supply manifold hole 7.

In the following, referring to the accompanying drawings, the embodiments of a fuel cell system according to the invention will be described.

FIG. 6 is a schematic sectional view of a component in a fuel cell stack. In FIG. 6, reference numeral 21 means a bipolar plate. On one side of the bipolar plate, a concave groove-shaped fuel gas channel 21a is in parallel disposed in the form of a straight channel, and on the other side of the bipolar plate a concave groove-shaped oxidant gas channel 21b is also in parallel disposed in the form of a straight channel.

FIG. 7(a) is a plan view of a bipolar plate 21 viewed from the side of the fuel gas channels. A concave gas inlet header 21c connected to each fuel gas channel 21a is disposed in the inlet of the fuel gas channel 21a, and a fuel gas supply manifold 21d is connected to the gas inlet header 21c. Similarly, a concave gas outlet header 21e connected to each fuel gas channels 21a is disposed in the outlet of the fuel gas channel 21a, and a fuel gas discharge manifold 21f is connected to the gas outlet header 21e. Moreover, a nozzle-shaped flow resistance generation section 21g is mounted in the inlet area of the fuel gas channels 21a, so that the cross section of each fuel gas channel 21a is reduced. As a result, the fuel gas flows from the fuel gas supply manifold 21d to the gas inlet header 21c and then flows into each fuel gas channel 21a after accelerated by the flow resistance generation section 21g. Thereafter, the fuel gas is discharged from the outlet of the fuel gas channels 21a to the gas outlet header 21e before coming together, and finally discharged into the fuel gas discharge manifold 21f.

FIG. 7(b) is a plan view of the bipolar plate 21 viewed from the side of the oxidant gas channels. A concave gas inlet header 21h connected to each oxidant gas channel 21b is disposed in the inlet of the oxidant gas channels 21b and a concave gas outlet header 21i connected to each oxidant gas channel 21b is disposed in the outlet of the oxidant gas channels 21b. In the inlet area of the oxidant gas channels 21b, a nozzle-shaped flow resistance generation section 21j is mounted, so that the cross section of each oxidant gas channel 21b is reduced. As a result, the oxidant gas of air flows into the gas inlet header 21h, and then flows into each oxidant gas channel 21b after accelerated by the flow resistance generation section 21j. Thereafter, the oxidant gas is discharged from the outlet for the oxidant gas channels 21b to the gas outlet header 21i, and then discharged to the outside. In FIGS. 7(a) and 7(b), reference numerals 21k and 21m mean a water supply manifold and water discharge manifold, respectively.

In FIG. 6, reference numeral 22 means an anode cooling plate. A concave groove-shaped fuel gas channels 22a are in parallel disposed in a straight groove on one surface of the anode cooling plate, and similarly a concave groove-shaped heat medium channels 22b are in parallel disposed in a straight groove on the other surface of the anode cooling plate.

FIG. 8(a) is a plan view of the anode cooling plate 22 viewed from the side of the fuel gas channels. A concave gas inlet header 22c connected to each fuel gas channel 22a is disposed in the inlet of the fuel gas channels 22a, and the gas inlet header 22c is connected to a fuel gas supply manifold 22d. Similarly, a concave gas outlet header 22e connected to each fuel gas channel 22a is disposed in the outlet of the fuel gas channels 22a, and the gas outlet header 22e is connected to a gas discharge manifold 22f. Moreover, a nozzle-shaped flow resistance generation section 22g is mounted in the inlet area of the fuel gas channels 22a, so that the cross section of each fuel gas channel 22a is reduced. As a result, the fuel gas flows from the fuel gas supply manifold 22d to the gas inlet header 22c, and then flows into each fuel gas channel after accelerated by the flow resistance generation section 22g. Thereafter, the fuel gas is discharged from the outlet of the gas channels 22a to the gas outlet header 22e before coming together, and then discharged to the fuel gas discharge manifold 22f.

FIG. 8(b) is a plan view of the anode cooling plate 22 viewed from the side of the heat medium channels. A concave heat medium inlet header 22h connected to each heat medium channel 22b is disposed in the inlet for the heat medium channels 22b, and the heat medium inlet header 22h is connected to a heat medium supply manifold 22k. Similarly, a concave heat medium outlet header 22i connected to each heat medium channel 22b is disposed in the outlet for the heat medium channels 22b, and the heat medium outlet header 22i is connected to a heat discharge manifold 22m. As a result, the heat medium of water flows from the heat medium supply manifold 22k to the heat medium inlet header 22h, and then flows into each heat medium channel 22b. Thereafter, the heat medium is discharged from the outlet of the heat medium channels 22b to the heat medium outlet header 22i before coming together, and finally discharged to the heat medium discharge manifold 22m.

The anode cooling plate 22 thus structured is arranged such that the surface of the anode cooling plate 22 on the side of the fuel gas channels 22a faces the surface on the side of the oxidant gas channels 21b of the bipolar plate 21, and that a cell (membrane electrode assembly: MEA) is inserted between the above-mentioned surfaces. Then, a gasket G is disposed in such a way that it surrounds the periphery of the cell.

In FIG. 6, reference numeral 23 means a cathode cooling plate. A concave groove-shaped oxidant gas channels 23b are disposed in a straight and parallel flow channel on one surface of the cathode cooling plate 23.

FIG. 9(a) is a plan view of the cathode cooling plate 23 viewed from the side of the oxidant gas channels 23b. A concave gas inlet header 23h connected to each oxidant gas channel 23b is disposed in the inlet for the oxidant gas channels 23b, and a concave gas outlet header 23i connected to each oxidant gas channel 23b is disposed in the outlet for the oxidant gas channels 23b. A nozzle-shaped flow resistance generation section 23g is mounted to the inlet area for the oxidant gas channels 23b, and the cross section of each oxidant gas channel 23b is reduced. As a result, the oxidant gas of air flows into the gas inlet header 23h, and further flows into each oxidant gas channel 23b after accelerated by the flow resistance generation section 23g. Thereafter, the oxidant gas is discharged from the outlet for the oxidant gas channels 23b to the gas outlet header 23i and finally discharged to the outside. FIG. 9(b) is a plan view of the cathode cooling plate 23, viewed from the side on which the oxidant gas channels 23b are not formed. In FIGS. 9(a) and 9(b), reference numerals 23d, 23f, 23k and 23m mean a fuel gas supply manifold, fuel gas discharge manifold, heat medium supply manifold and a heat medium discharge manifold, respectively.

The cathode cooling plate 23 is positioned such that the side on which the oxidant gas channels 23b are not formed faces the side of the heat medium channels 22b in the anode cooling plate 22, as shown in FIG. 6. Namely, FIG. 6 shows that the oxidant gas inlet header 23h which is shown in FIG. 9(a) is positioned to be back to back with the heat medium inlet header 22h or the heat medium outlet header 22i. The heat medium inlet header 22h and the heat medium outlet header 22i are shown in FIG. 8(b). Moreover, regarding the cathode cooling plate 23, the side on which the fuel gas channels 21a in the bipolar plate 21 having the same structure as in the above-mentioned bipolar plate 21 are formed faces the side of the oxidant gas channels 23b, and the bipolar plate 21 is positioned by inserting a cell (membrane electrode assembly: MEA) therebetween. In this case, a gasket G is also mounted such that it surrounds the periphery of the cell.

The respective plates are combined with each other in the above-mentioned sequence and then stacked. Moreover, end plates (not shown) are attached to both ends of the plates thus stacked, and then fastened by rods or the like to form a fuel cell stack. In the respective plates, the fuel gas supply manifold, fuel gas discharge manifold, heat medium supply manifold and the heat discharge manifold provide through holes aligned in the stacking direction of the fuel cell stack. Thus, the fuel cell stack can also be constituted exclusively by the combination of an anode cooling plate and a cathode cooling plate without any bipolar plate.

Figure 10:
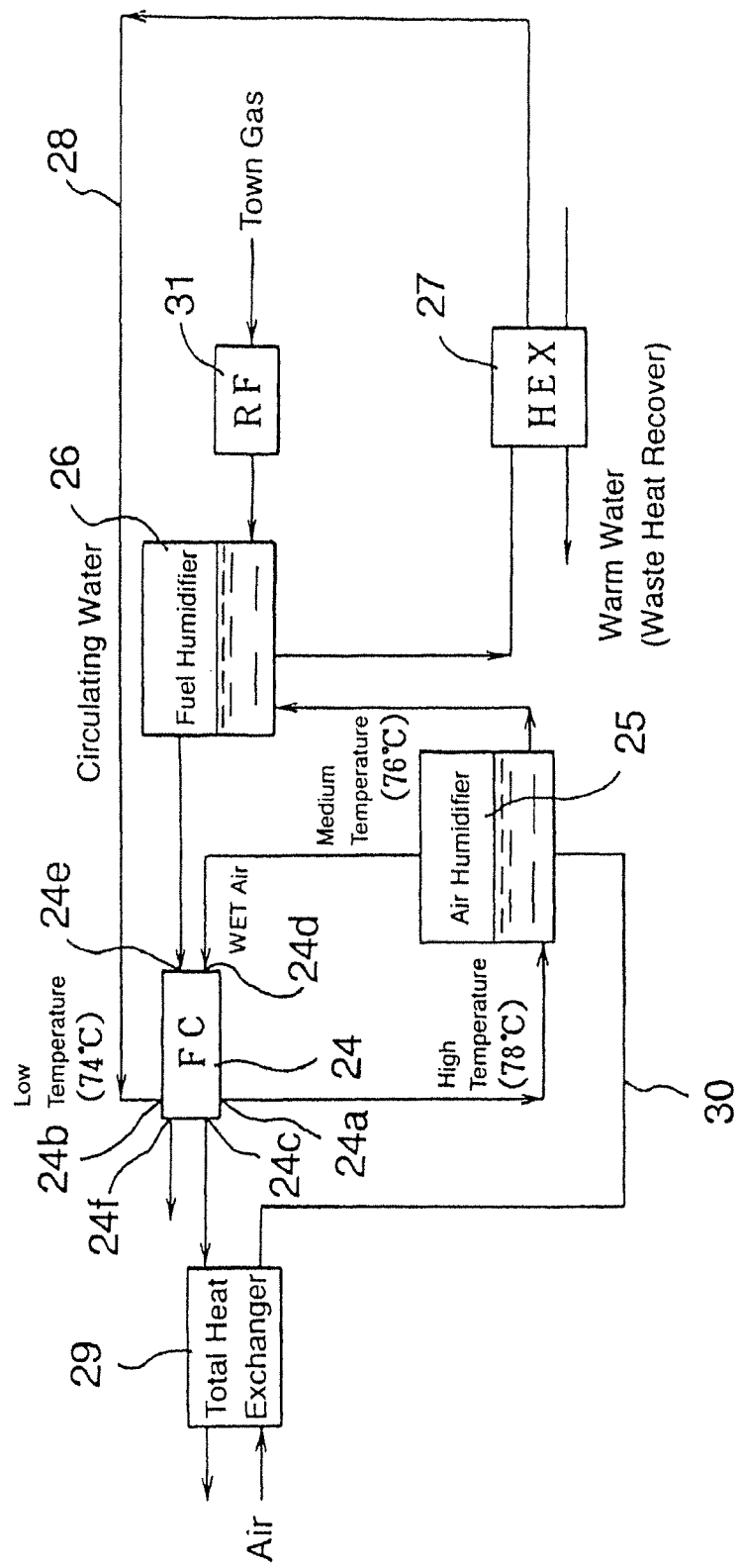
FIG. 10 is a block diagram of a fuel cell system in an embodiment of the invention.

FIG. 10 is a block diagram of an embodiment of a fuel cell system according to the invention. In this case, an air humidifier 25 is connected to a heat medium discharge outlet 24a of a fuel cell 24, and a fuel humidifier 26 is connected to the air humidifier 25. Furthermore, a heat exchanger 27 is connected to the fuel humidifier 26. Thus, a water circulation channel 28 for the cooling water as the heat medium is constituted by connecting the heat exchanger 27 to a heat medium supply opening 24b in the fuel cell 24.

Moreover, a total heat exchanger 29 is connected to an oxidant gas discharge opening 24c in the fuel cell 24 and the air humidifier 25 is connected to the total heat exchanger 29.

Thus, an air supply channel 30 for the oxidant gas of air is constituted by connecting the air humidifier 25 to an oxidant gas supply opening 24d. Furthermore, an oxidant gas supply opening 24d is disposed in an external manifold (not shown) mounted onto the upper part of the fuel cell stack for supplying the oxidant gas, and an oxidant gas discharge opening 24c is disposed in an external manifold (not shown) mounted onto the lower part of the fuel cell stack for discharging the oxidant gas. Thus, the fuel cell system is constituted such that the oxidant gas of air discharged from the oxidant gas channels in the respective plates comes altogether, and is discharged from the oxidant gas discharge opening 24c.

Moreover, a fuel reforming apparatus 31 is connected to the fuel humidifier 26, so that the fuel reforming apparatus 31 converts a raw fuel such as town gas or the like to a reformed gas containing hydrogen as a main component. In the fuel cell system, the reformed gas is humidified by the fuel humidifier 26 and then supplied to the fuel gas supply opening 24e in the fuel cell 24. The humidification is carried out by injecting the reformed gas into water stayed in the inside of the fuel humidifier 26. A wet fuel gas supplied to the fuel gas supply opening 24e in the fuel cell 24 is supplied into the connection hole aligned in the stacking direction of the fuel cell stack by the fuel gas supply manifold, and then distributed fuel gas inlet headers in the respective plates, and further flows along the respective fuel gas channels. The respective fuel gasses discharged from the fuel gas channels (the fuel gas discharged without reaction) coming together in the gas outlet section, and are discharged to the outside after passing through the connection hole in the stacking direction of the fuel cell stack. Generally, the fuel gas discharged to the outside without reaction is supplied from the fuel gas discharge opening 24f to a reforming burner in the fuel reforming apparatus and burned therein.

The air introduced as an oxidant gas from the outside exchanges the heat with water by the total heat exchanger 29, and then it is supplied to the oxidant gas supply opening 24d (in a more detailed expression, the oxidant gas supply opening in the external manifold) of the fuel cell 24 via the air humidifier 25. Water stays in the inside of the air humidifier 25, and the air is humidified by injecting the air into the water. A wet air supplied to the oxidant gas supply opening 24d of the fuel cell 24 is distributed into the gas inlet headers in the respective plates and flows along the respective oxidant gas channels. The airs discharged from the respective oxidant gas channels (the airs discharged without reaction) comes together in the gas outlet header, and then discharged from the oxidant gas discharge opening 24c in the fuel cell 24 (in a more detailed expression, the oxidant gas outlet in the external manifold). The un-reacted air thus discharged is further discharged to the outside via the total heat exchanger 29.

As described above, the fuel gas and the oxidant gas are supplied to the fuel cell 24, so that an electrochemical reaction takes place via the solid polymer electrolyte membrane in the cell (membrane electrode assembly), thereby enabling a DC electric power to be generated. On the other hand, the water in the water circulating channel 28 is supplied to the heat medium supply opening 24b in the fuel cell 24, and flows the connection hole in the stacking direction in the fuel cell stack, and then distributed in the heat medium inlet headers of the respective anode cooling plates 22. The waters thus distributed flow along the respective heat medium channels, and the waters discharged from the respective heat medium channels come together in the heat medium outlet header. Thereafter, the water thus combined passes through the connection hole aligned in the stacking direction of the cell stack, and finally discharged from the heat medium discharge opening 24a.

The anode cooling plate 22 is disposed such that the heat medium channels 22b face the fuel gas channels 22a on the other side, as described above, thereby enabling the anode cooling plate 22 to be cooled. Furthermore, the heat medium channels 22b in the anode cooling plate 22 face the surface on which the oxidant gas channels of the cathode cooling plate 23 are not formed, thereby enabling the cathode cooling plate 23 to be cooled. As a result, the fuel cell 22 is cooled during the operation period in the electric power generation, and thereby enabling the fuel cell 22 to be maintained at a proper operation temperature (about 80° C.).

On the other hand, the heat medium of water discharged from the fuel cell 24 is heated up at a temperature of 78° C. or so. When water at such a high temperature is introduced into the air humidifier 25, the temperature in the inside thereof can be increased. However, the temperature of the water passed through the air humidifier 25 decreases at 76° C. or so, and the water at such a medium temperature is introduced into the fuel humidifier 26. The reformed gas at a high temperature (100 to 150° C.) from the fuel reforming apparatus 31 is introduced into the fuel humidifier 26, and injected into the water, as describe above, and therefore the water in the inside thereof is maintained at 75 to 76° C. after losing the evaporation heat. The air is supplied to the air humidifier 25 after the dew point becomes 64° C. or so in the total heat exchanger 29.

The hot water passed through the fuel humidifier 26 is introduced into the heat exchanger 27, in which the heat is exchanged between the hot water and the water supplied from a water reservoir (not shown), and then the water is returned to the water reservoir after changed into a hot water. The temperature of the water passed through the heat exchanger 27 is decreased to 74° C. or so. The water at such a low temperature is supplied to the heat medium supply opening 24b in the fuel cell 24. Accordingly, the heat in the cooling water as a heat medium can be efficiently used by circulating the cooling water discharged from the fuel cell 24 via the water circulating channel 28.

In accordance with the present invention, the dew point of the reaction gas is set at the temperature of the heat medium or smaller in the inlet area of the reaction gas, and the dew point of the reaction gas is set at the temperature of the heat medium or grater in the outlet area of the reaction gas.

Setting the temperature of the dew point of the reaction gas less than temperature of the heat medium causes the reaction gas to be heated up in the inlet area by the heat medium, thereby making it possible to prevent the water vapor in the wet reaction gas from dew condensation in the inlet area. Accordingly, the condensed water is not deposited onto the gas channels in the inlet area of the reaction gas, so that the reaction gas starts to smoothly flow.

Setting the dew point of the reaction gas greater than the temperature of the heat medium in the outlet area of the reaction gas causes the reaction gas to be cooled in the outlet area by the heat medium, thereby the water vapor in the reaction gas to be occasionally condensed. However, when the condensed water is adhered to the inner wall of the gas channels in the outlet area, a uniform pressure is applied to the respective gas channels, thereby enabling the water droplets to be blown away. Accordingly, the condensed water can be discharged in a short time to the gas outlet header. If the condensed water is adhered to the inner wall of part of the gas channels, and thereby clogs the gas channels, as in the prior art, uniform gas distribution does not occur in the respective gas channels, thereby causing an instable operation to take place in the power generation. In addition, the reaction gas is deflected to the other gas channel, hence making it difficult to blow away the water droplets. In accordance with the present invention, as described above, the dew condensation is compulsively carried out inside the respective gas channels in the outlet area of the reaction gas, so that the pressure loss is homogenized over the gas channels, thereby enabling a uniform gas distribution to be attained.

In the above embodiments, it is described that the fuel gas flows parallel to the oxidant gas from top to bottom in the direction of gravity, whereas the heat medium flows in the direction anti-parallel to the reaction gas. However, it is possible that the heat medium supplies in the direction parallel to the reaction gas. In this case, it is preferable that the cooling water discharged from the fuel cell 24 flows in sequence from the heat recover heat exchanger 27, air humidifier 25, and the fuel humidifier 26, and then returned to the fuel cell 24.

While preferred embodiments have been shown and described, various modifications and substitutions may be made without departing from the spirit and scope of the invention. Accordingly, it is to be understood that the present invention has been described by way of examples, and not by limitations.

What is claimed is:

1. A fuel cell system comprising:
    a fuel cell comprising:
        a plurality of membrane-electrode assemblies each structured such that an anode bonded to a first surface of an electrolyte membrane and a cathode bonded to a second surface, opposite to the first surface, of the electrolyte membrane,
        a plurality of plates each having at least one path of a fuel gas path for supplying fuel gas to the anode, an oxidant gas path for supplying oxidant gas to the cathode and a heat medium path for flowing a first heat medium,
        a heat medium supply inlet, and
        a heat medium discharge outlet;
    a fuel humidifier;
    an oxidant humidifier,
    a heat exchanger for heat-exchanging the first heat medium with a second heat medium;
    wherein the fuel gas and the oxidant gas flow parallel to each other and the heat medium flows in the direction parallel to both the fuel gas and the oxidant gas in the fuel cell, and
    wherein the heat medium discharge outlet is connected to the heat exchanger, the heat exchanger is connected to the any one of the fuel humidifier and the oxidant humidifier, the any one of the fuel humidifier and the oxidant humidifier is connected to the other one of the fuel humidifier and the oxidant humidifier, the other one of the fuel humidifier and the oxidant humidifier is connected to the heat medium supply inlet to form a circulation path for the heat medium heat-exchanging at the fuel cell, the fuel humidifier, the oxidant humidifier and the heat exchanger.

2. The fuel cell system according to claim 1, wherein first heat medium discharged from the fuel cell and flown to the heat exchanger, the oxidant humidifier and the fuel humidifier in the order returns to the fuel cell.

3. The fuel cell system according to claim 1, wherein the fuel cell system further comprises a total heat-exchanger, the total heat-exchanger having a first supply inlet for a first fluid, a second supply inlet for a second fluid, a first fluid discharge outlet for the first fluid and a second fluid discharge outlet for the second fluid, and
    wherein the fuel gas is supplied to the first supply inlet of the total heat-exchanger, the fuel humidifier is connected to the first fluid discharge outlet, the fuel gas supply inlet of the fuel cell is connected to the fuel humidifier, the second fluid supply inlet is connected to the fuel gas discharge outlet of the fuel cell, and the fuel gas is discharged from the second fluid discharge outlet of the total heat-exchanger, to form a fuel gas path.

4. The fuel cell system according to claim 2, wherein the fuel cell system further comprises a total heat-exchanger, the total heat-exchanger having a first supply inlet for a first fluid, a second supply inlet for a second fluid, a first fluid discharge outlet for the first fluid and a second fluid discharge outlet for the second fluid, and
    wherein the fuel gas is supplied to the first supply inlet of the total heat-exchanger, the fuel humidifier is connected to the first fluid discharge outlet, the fuel gas supply inlet of the fuel cell is connected to the fuel humidifier, the second fluid supply inlet is connected to the fuel gas discharge outlet of the fuel cell, and the fuel gas is discharged from the second fluid discharge outlet of the total heat-exchanger, to form a fuel gas path.

5. The fuel cell system according to claim 1, wherein the fuel cell system further comprises a total heat-exchanger, the total heat-exchanger having a first supply inlet for a first fluid, a second supply inlet for a second fluid, a first fluid discharge outlet for the first fluid and a second fluid discharge outlet for the second fluid, and
    wherein the oxidant gas is supplied to the first supply inlet of the total heat-exchanger, the oxidant humidifier is connected to the first fluid discharge outlet, the oxidant gas supply inlet of the fuel cell is connected to the oxidant humidifier, the second fluid supply inlet is connected to the oxidant gas discharge outlet of the fuel cell, and the oxidant gas is discharged from the second fluid discharge outlet of the total heat-exchanger, to form an oxidant gas path.

6. The fuel cell system according to claim 2, wherein the fuel cell system further comprises a total heat-exchanger, the total heat-exchanger having a first supply inlet for a first fluid, a second supply inlet for a second fluid, a first fluid discharge outlet for the first fluid and a second fluid discharge outlet for the second fluid, and
    wherein the oxidant gas is supplied to the first supply inlet of the total heat-exchanger, the oxidant humidifier is connected to the first fluid discharge outlet, the oxidant gas supply inlet of the fuel cell is connected to the oxidant humidifier, the second fluid supply inlet is connected to the oxidant gas discharge outlet of the fuel cell, and the oxidant gas is discharged from the second fluid discharge outlet of the total heat-exchanger, to form an oxidant gas path.

* * * * *